United States Patent [19]
Robinson

[11] Patent Number: 5,812,091
[45] Date of Patent: Sep. 22, 1998

[54] RADIO INTERFEROMETRIC ANTENNA FOR ANGLE CODING

[76] Inventor: Stephen J. Robinson, 140 The Street, Kirtling, Newmarket, Suffolk, England, CB8 9PO

[21] Appl. No.: 790,319

[22] Filed: Jan. 28, 1997

[30] Foreign Application Priority Data

Feb. 1, 1996 [GB] United Kingdom ............... 9602005

[51] Int. Cl.$^6$ ........................................................ G01S 5/02
[52] U.S. Cl. ........................ 342/424; 342/156; 342/442
[58] Field of Search ................................ 342/156, 360, 342/424, 442

[56] References Cited

U.S. PATENT DOCUMENTS

| | | | |
|---|---|---|---|
| 3,842,419 | 10/1974 | Arndt | 343/112 D |
| 4,368,469 | 1/1983 | Ott et al. | 343/100 ST |
| 4,509,052 | 4/1985 | Cash | 343/418 |
| 4,638,320 | 1/1987 | Eggert et al. | 342/442 |
| 4,673,944 | 6/1987 | Graves | 342/424 |
| 5,010,343 | 4/1991 | Andersson | 342/432 |
| 5,153,594 | 10/1992 | Moffat | 342/15 |
| 5,570,097 | 10/1996 | Aguado | 342/357 |

FOREIGN PATENT DOCUMENTS

| | | |
|---|---|---|
| 508175 | 11/1976 | Australia . |
| 1333546 | 5/1972 | United Kingdom . |
| 1401273 | 7/1975 | United Kingdom . |
| 1449196 | 9/1976 | United Kingdom . |
| 1506821 | 4/1978 | United Kingdom . |
| 2096854 | 10/1982 | United Kingdom . |
| 2147170 | 5/1985 | United Kingdom . |
| 2202092 | 12/1987 | United Kingdom . |
| 2272577 | 11/1992 | United Kingdom . |

OTHER PUBLICATIONS

White, "Low–Angle Radar Tracking in The Presence of Multipath", IEEE Transactions on Aerospace and Electronic Systems, vol. AES–10, No. 6, Nov. 1974, pp. 835–845.

*Primary Examiner*—Thomas H. Tarcza
*Assistant Examiner*—Dao L. Phan
*Attorney, Agent, or Firm*—Nixon & Vanderhye, P.C.

[57] ABSTRACT

An antenna array for radio interferometry uses three equispaced triplets set vertically above the ground with different respective spacings, the center antenna of each triplet being at a different height. Signal processing circuits provide for each triplet a signal which is a function of the elevation angle $\theta$ but is independent of the ground reflection coefficient, P. the signals are weighted to give the optimum value of $\theta$, e.g., by selecting the signal varying most rapidly with $\theta$. Some antennae can be shared and for example three triplets may be provided by seven antenna elements.

27 Claims, 4 Drawing Sheets

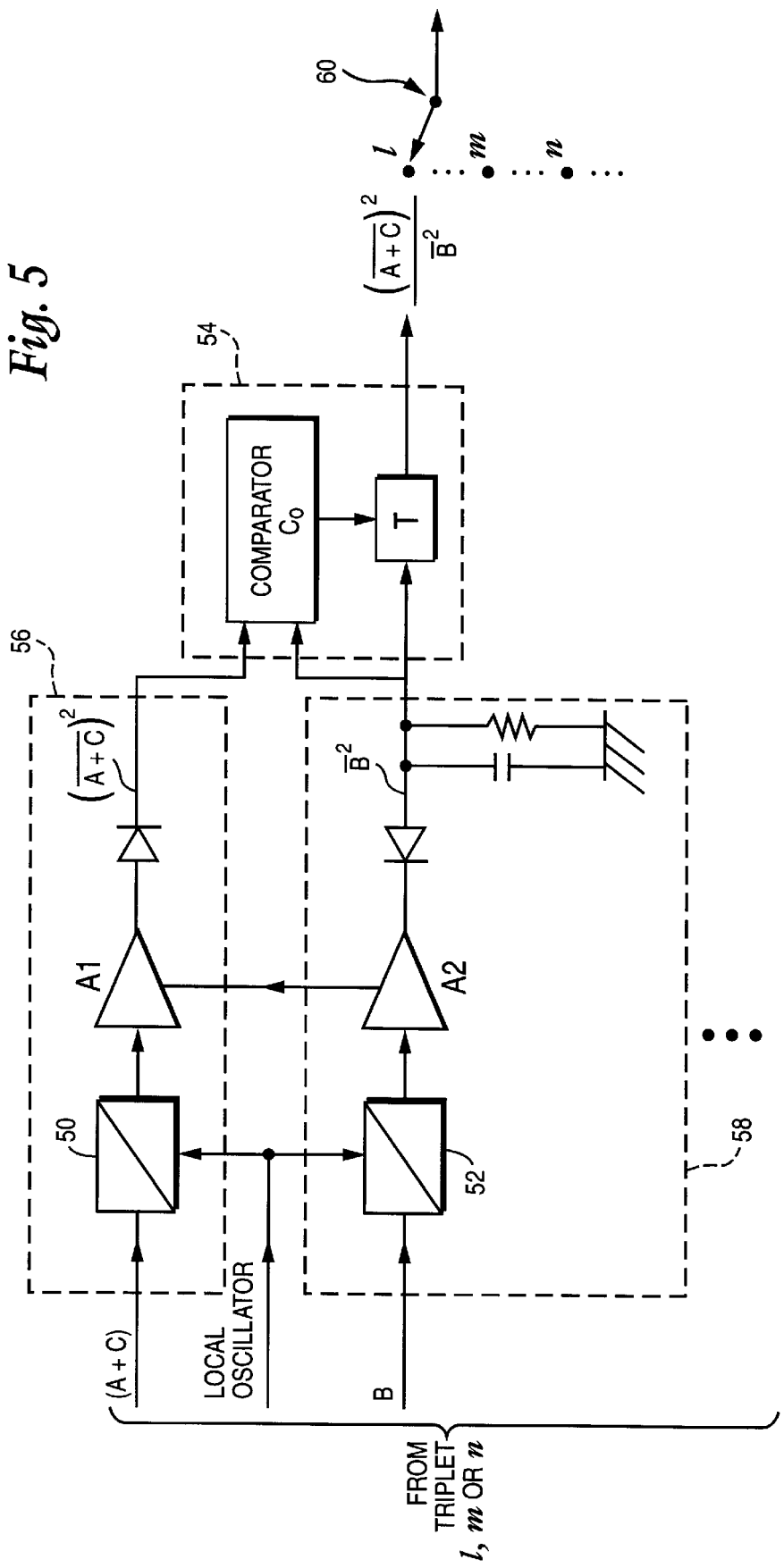

RADIO INTERFEROMETRIC ANTENNA FOR ANGLE CODING

BACKGROUND OF THE INVENTION

1. Field of the Invention

The invention relates to arrangements of antenna elements to measure the direction of propagation of electromagnetic radiation.

2. Related Art

The directional properties of antennae and the processing of phase and amplitude information from separate antenna elements has long been used for determining the angle of arrival of signals, and thus determining the direction of the source transmitter. However, low elevation angles are difficult to measure because of interference from strong unquantifiable reflections from the ground. Moreover, radio direction finders and navigation systems are constrained by weather conditions, to use relatively low operating frequencies, where ground reflections cannot be excluded by the natural directivity of practical antennae.

A unique equi-spaced triplet arrangement of similar antenna elements was identified in U.K. Patent No. 1449196 (incorporated herein by reference), which when placed orthogonal to a reflecting ground plane, could be used to determine a function of elevation angle which was independent of the unknown ground reflection coefficient. Patent No. 1449196 describes the use of a triplet to define fixed angles in the elevation plane, within which angle measurements were made by other means. This invention extends these ideas to optimize angle measurements, using the triplet itself, notably over selected sectors at low elevation angles.

The prior art of UK 1449196 is illustrated in FIG. 1, which shows a single equi-spaced triplet for which the two R.F. outputs A+C and B are shown in the above patent to be;

$$A+C = 2f(a,p,r,h,P,\theta)\cos(2\cdot\Pi\cdot d\cdot\sin\theta/\lambda) \ldots \quad (1)$$

$$B = f(a,p,r,h,P,\theta) \ldots \quad (2)$$

Where:
- a represents the antenna element pattern.
- P represents the transmitted power.
- r represents the range to the transmitter.
- h represents the mid-height of the triplet.
- p represents the ground reflection coefficient.
- θ represents the elevation angle.
- d represents the spacing between triplet elements,; and
- λ represents the wavelength of the transmitted signal. The function f(..) represents the essential strength of the radio signal and is designated S.

Whence, the quotient of (1) and (2) above is independent of a,p,r,h and P. The quotient of other functions of (1) and (2), for example the square or the modulus, is also independent of a,p,r,h, and P. The square of the signal amplitude is the natural output of a radio receiver, and takes only positive values, which is advantageous for post detection signal processing.

At low elevation angles, p approximates to −1, and in this case S (representing the function (f)) simplifies to;

$$S = f'(a,P,r)\sin(2\cdot\Pi\cdot h\cdot\sin\theta/\lambda) \ldots \quad (3)$$

so that h may be chosen to maximize the amplitude of S.

Measurement of elevation angle can only be made, when S is non-zero, and is best made when S is changing slowly, with angle, near its maximum value.

It will also be noted that when d =λ/2, (A+C)/2B takes values from 1 to −1 as the elevation angle changes over 90 degrees, typically, from the horizontal to the vertical. Larger values of d and other functions of (A+C)/2B may increase the sensitivity with which the elevation angle can be measured. However, for a single triplet, the angle measurement may become ambiguous over the angular range of interest.

SUMMARY OF THE INVENTION

It is one object or this invention to overcome such ambiguity.

According to this invention, an antenna array for operation by radio interferometric techniques comprises; at least four antennae spaced so as to provide at least two equi-spaced linear triplets perpendicular to a ground plane, each triplet will be characterized by the spacing of its elements and the height of the centre element above the ground plane; radio receiver means to obtain from each antenna of each triplet an information signal of which both amplitude and phase relative to the amplitude and phase of information signals obtained from other antennae of each triplet are functions of the elevation angles θ of incidence upon the array of a radio wave arriving from a remote source and of the ground reflection coefficient p; first logic means (56 in FIG. 5) associated with each triplet to combine vectorially the information signals obtained from the outermost antennae of that triplet to provide a first derived signal of which the amplitude represents the modulus of such combination; second logic means (58 in FIG. 5) associated with each triplet arranged to derive from an information signal obtained from the centre antenna of each triplet a second derived signal of which the amplitude represents the modulus of that information signal from the said centre antenna; dividing means associated with each triplet arranged to divide one derived signal by the other to provide a quotient signal for each triplet which is a function of θ but not of p; and selection means (60 in FIG. 5) to provide at least one quotient signal which provides a measure of the elevation angle.

The array may either operate in a receive mode, in which case unambiguous angle measurement is provided by the signal processing circuits embodied in the antennae receivers, as described, or in a transmit mode in which case the transmitted signal from each antenna in the array must be coded so that it can be identified to enable a quotient representing angle to be derived for each triplet in a remote receiver. It will be noted that a common coherent carrier is required for the transmissions from each element of any triplet to achieve the interferometric performance, but that coherence between triplets is not required.

BREIF DESCRIPTION OF THE DRAWINGS

The invention will now be described by way of example only with reference to the accompanying drawings, in which.

Figure 3:
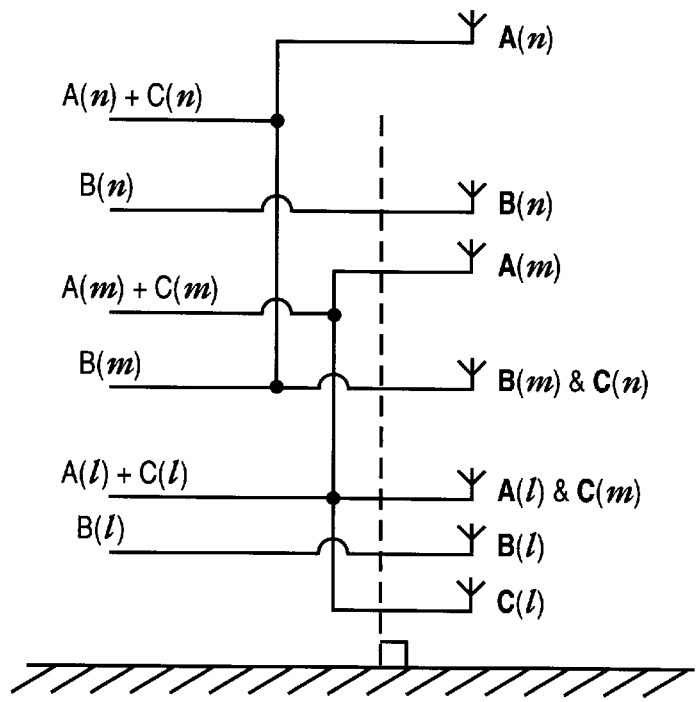

FIG. 3 illustrated a practical embodiment of an antenna arranged as three triplets.

Figure 4:
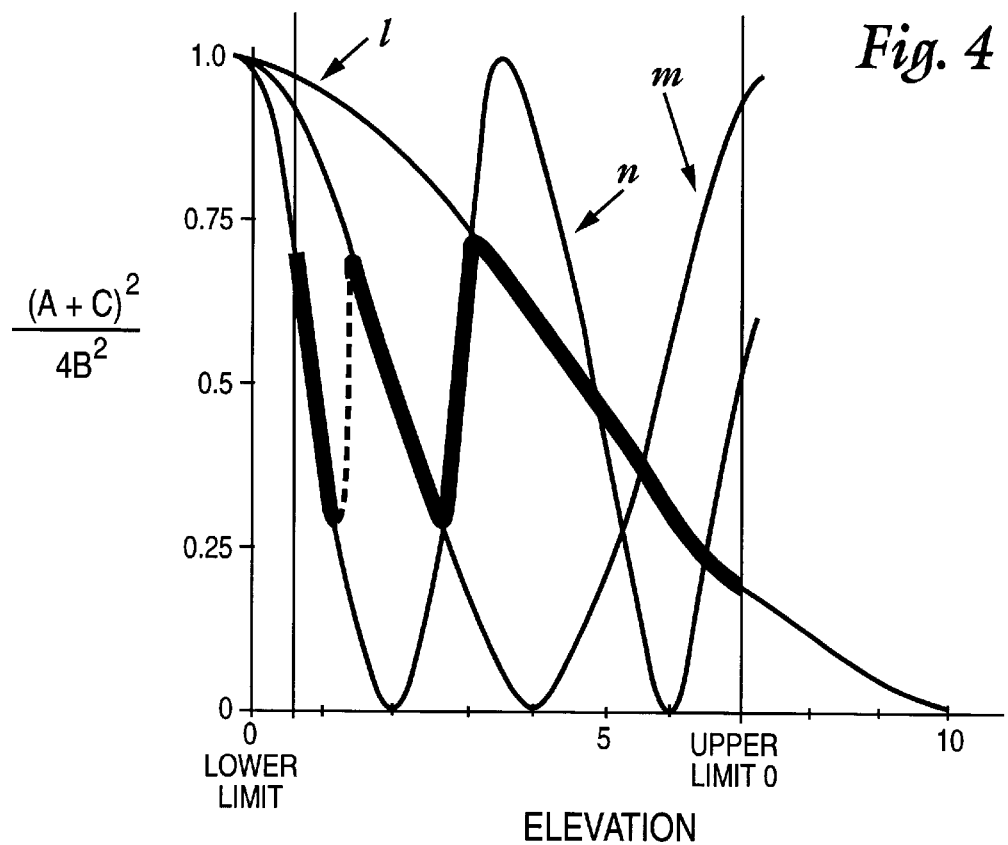

FIG. 4 is a plot of signal against elevation for the three triplets illustrated in FIG. 3.

Figure 1:
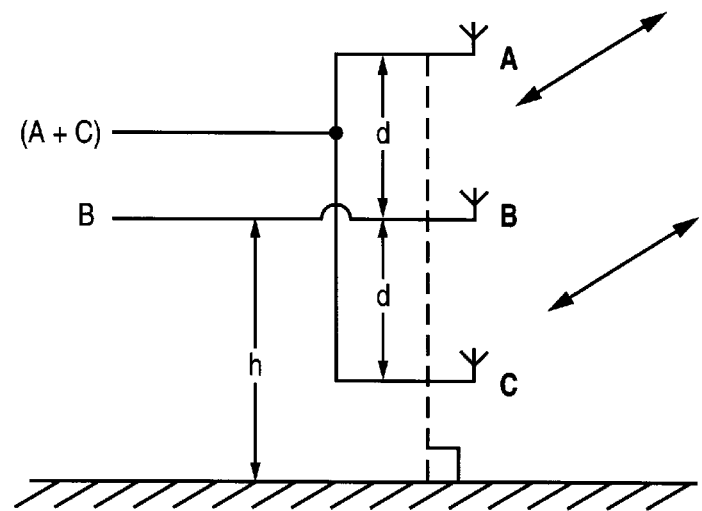
FIG. 1 illustrates the prior art arrangement using a single triplet.
Figure 6:
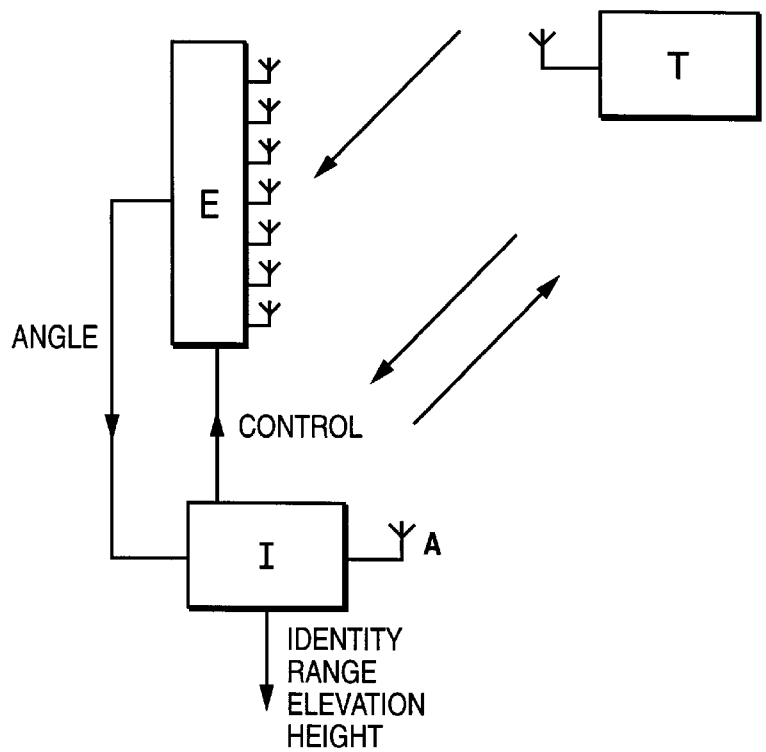

FIG. 5 illustrates a possible circuit for measuring the quotient signal. FIG. 6 illustrates the possible use of the array shown in FIG. 3 for determining the range, identity and elevation angle of an aircraft carrying a suitable transponder.

DETAILED DESCRIPTION OF EXEMPLARY EMBODIMENTS

Figure 2:
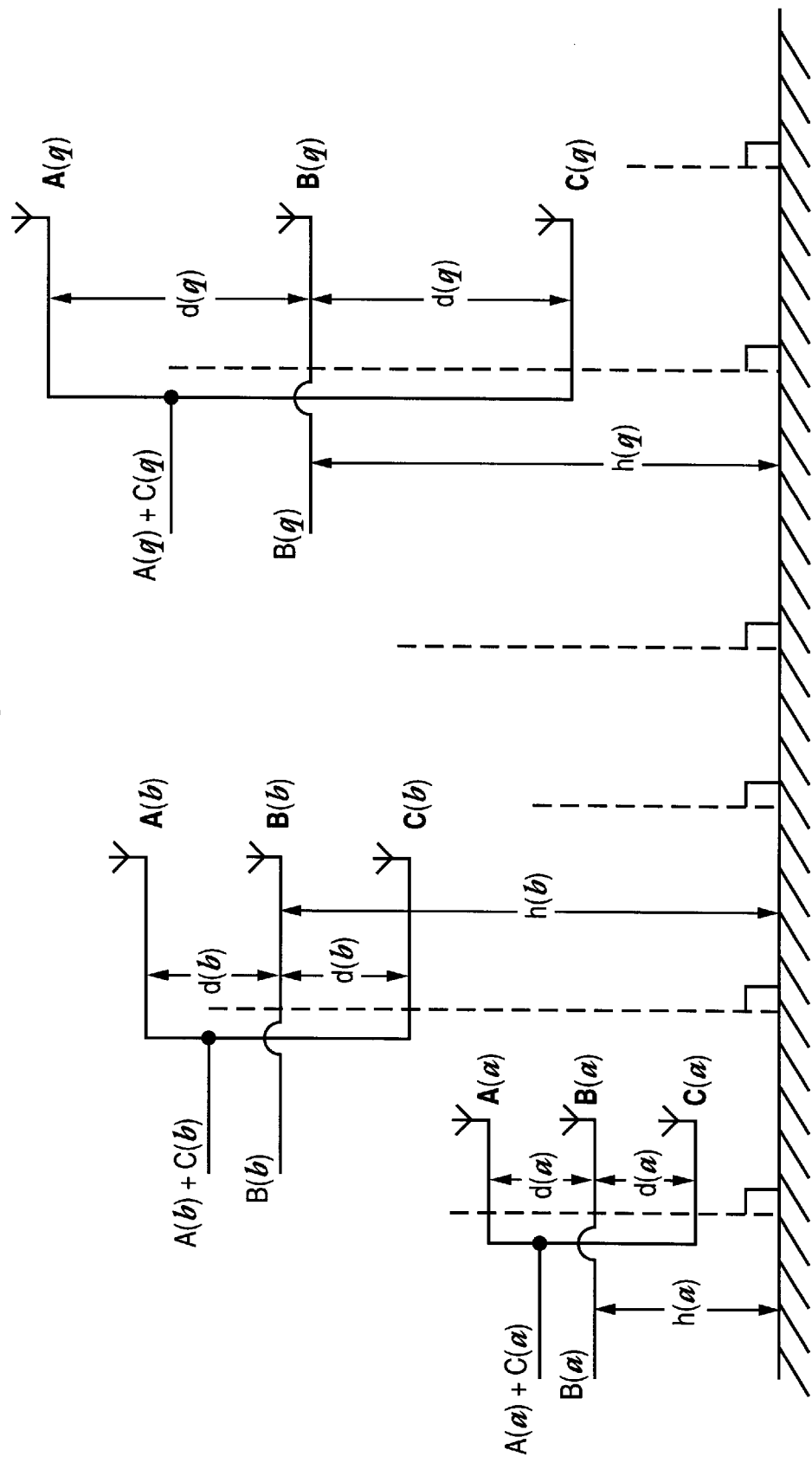
FIG. 2 illustrates the principle of operation of an antenna array arranged as triplets.

In FIG. 2, three triplets of a general set are shown, each having three antennae A, B and C spaced in line at right angles to, and above a ground plane, shown shaded. The three triplets are respectively referenced a, b and q, and have different spacings d, and different heights h above the ground plane of the central antenna B in each triplet.

Only three triplets are shown, but in principle two or more can be provided.

In each triplet, the two output signals (B) and (A+C) are indicated.

The triplet arrays may be used in receiving or transmitting mode, and one application of each will be described by way of example.

FIG. 3 shows seven antenna elements deployed as three triplets arranged to operate on responses from secondary surveillance radar interrogations, at a wavelength of about 30 centimeters. It is assumed, for this example, that processing the signals to determine the quotient is best carried out on the signals A+C and B after detection by "square law" detectors.

The design aims in this example, are;

to provide unambiguous angle measurements up to about 7 degrees.

to provide measurement accuracy and resolution of the order +/−0.05 degrees from 3 degrees, at which aircraft normally approach to land, down to the lowest angle possible (about +0.5 degrees in this case).

use the smallest number of antenna elements possible, with the lowest element not so close to the ground, that it might be obscured, and the highest antenna element at an acceptable height.

d is chosen for the elevation angle, at which most measurement sensitivity is required, and h is chosen for the elevation angle at which S is close to its maximum value. For these criteria values for h and d are calculated from the relationships;

$$2 \cdot \Pi \cdot d \cdot \sin\theta / \lambda = (n+1)\Pi/4 \ldots \quad (4)$$

$$2 \cdot \Pi \cdot h \cdot \sin\theta / \lambda = (n+1)\Pi/2 \ldots \quad (5)$$

where n is the integer 0,1,2,3,. . .

In this example values of d and h are optimized for approximately the same elevation angles, so that amplitude S is at a maximum and altering slowly at angles where sensitive measurements are needed. It will also be noted that in this example, three triplets are sufficient to give the unambiguous sector coverage required (approximately 0.5 degrees to 7.0 degrees), and that by examining and averaging the three measurements obtained a judgement on optimum measurement integrity can be made.

Referring to FIG. 3, the triplet (n) is arranged to give its best measurements at around one degree and three degrees, the triplet (m), to give its best measurements at around two degrees and the triplet (l), its best at around five degrees. All readings are examined at each elevation angle to decide which triplet measurement is to be preferred, and the extent of the agreement between the three readings is a measure of the integrity of the system. In general, a suitably weighted average of the three readings will give the optimum result.

Typical values that might be chosen for d and h, in wavelengths, are then as follows;

| (d) (l) = 1.5   | h (l) = 2.5    |
| (d) (m) = 3.75  | h (m) = 7.75   |
| d (n) = 7.5     | h (n) = 15.25  |

The highest element is at 22.75 wavelengths, which is about 7 metetrs from the ground.

It will be noted that, subject to a small variation to allow antenna elements to be shared between triplets, h=2d, and that common values of sin θ satisfy both equations (4) and (5) for all values of n. Thus, a very long array with a suitable ambiguity resolving system, is capable of giving very high angle measurement accuracy over each of its high amplitude regions.

The thick lines on FIG. 4 show the preferred measurement ranges for each triplet l, m and n.

This example is appropriate to the important application of monitoring the height of aircraft approaching to land, which, hitherto, has not been easily achieved with the standard secondary surveillance radar system. However, many other arrangements are possible for civil and military applications, where the measurement of the elevation angle of an emitting or reflecting object is required.

FIG. 5 shows one of many possible arrangements for measuring the quotient $\{(A+C)/B\}$, all squared. Superheterodyne receivers (e.g. superheterodyne frequency converters 50 and 52 fed by a common local oscillator. will normally be necessary to achieve the sensitivity required and the dynamic range of function (S), for example, for an aircraft flying from a range of 20,000 metres to one of 200 metres will be large. However, $2B>(A+C)$ and the squared quotient is always positive and, normally, will be in the range 0.33 to 0.67. In FIG. 5, a divider 54 is used, where B sets the gain of two balanced amplifiers (A1 and A2), and a timer (T) and comparator (C) measure the decay time of the CR circuit from a charged voltage corresponding to 4{B squared} from second circuit 58, to the voltage corresponding to {(A+C) squared} from first circuit 56. It is well known that the exponential nature of the decay, ensures that the time delay measured at the output of divider 54, is a function of the quotient required, and is independent of the absolute amplitude of the signals. In a further refinement the received signals are sampled as quickly as possible after their arrival, so that multi-path interference effects from lateral, and therefore delayed, reflections are minimized. The particular desired one of the triplets 1, m, n may be selected by selector 60 for further processing.

However, other suitable circuits may be used.

FIG. 6 shows a system in which a directional secondary surveillance radar interrogator (I), measures the range of identified aircraft (T), and triggers a measurement, by the elevation measuring system (E) described, on part or all of the reply message from the selected aircraft. Thus angles are firmly associated with particular identified aircraft, at a known range. In one possible embodiment, the high directivity of the interrogator antenna (A) is also used to set the seven degree upper coverage limit, by blanking the system, when the signals it receives, fall below those received by any antenna in the elevation array.

An alternative application of the antenna array shown in FIG. 3, is to provide coding, by radio transmissions, of angles in space. Triplet 1 may be energized by a coherent carrier in which elements A and C are amplitude modulated at a frequency l(a) and B at a frequency l(b). The modulation sidebands will carry the effective amplitude of the carrier, and the quotient of the amplitude of l(a) divided by the amplitude of l(b) may be derived, after demodulation, in a remote receiver. Likewise quotients m(a) divided by m(b) and n(a) divided by n(b) may be derived, and the optimum value of the elevation angle of the receiver with respect to the array ground plane, obtained.

We claim:

1. An antenna array apparatus for use in measuring the relative orientation of received radio signals by radio interferometric techniques, said apparatus comprising;

at least four antennae spaced so as to provide at least two equi-spaced linear triplets perpendicular to a ground plane, each triplet having different spacing;

radio receiver means connected to obtain from each antenna of each triplet an information signal of which both amplitude and phase relative to the amplitude and phase of information signals obtained from other antennae of each triplet are functions of the elevation angle, θ, with respect to the ground plane, of incidence upon the array of a radio wave arriving from a remote source and of the ground reflection coefficient p;

first means associated with each triplet to combine vectorially the information signals obtained from the outermost antennae of that triplet to provide a first derived signal of which the amplitude represents the modulus of such combination;

second means associated with each triplet arranged to derive from an information signal obtained from the center antenna of each triplet a second derived signal of which the amplitude represents the modulus of that information signal from the said center antenna;

dividing means associated with each triplet and arranged to divide one derived signal by the other to provide a quotient signal for each triplet which is a finction of θ but not of p; and selection means to provide at least one of said quotient signals which provides a measure of the angle of elevation.

2. An antenna array as in claim 1 in which the selection means is arranged to provide an optimum value of measurement of angle of elevation above the ground plane of received radio waves.

3. An antenna array as in claim 2 in which the optimum value is the measurement having the highest sensitivity and said selection means is arranged to favour the triplet having the most appropriate spacing.

4. An antenna array as in claim 2 in which the optimum value is the measurement having the highest value of strength S and the selection means is arranged to favour the triplet with the most appropriate height above the ground plane.

5. An antenna array as in claim 4 further comprising:

circuit means to determine the rate of variation of each quotient with variation of θ, and wherein the selection means is arranged to favour the quotient having the greatest rate of variation.

6. An antenna as in claim 1 comprising nine antenna elements arranged as three linear triplets.

7. An antenna array as in claim 1 comprising seven antenna elements arranged as three triplets.

8. An antenna array apparatus for use in measuring the relative orientation of received radio signals by radio interferometric techniques, said apparatus comprising:

at least four antennae spaced so as to provide at least two equi-spaced linear triplets perpendicular to a ground plane, the center antenna of each triplet being at a different height above the ground plane;

radio receiver means connected to obtain from each antenna of each triplet an information signal of which both amplitude and phase relative to the amplitude and phase of information signals obtained from other antennae of each triplet are functions of the elevation angle, θ, with respect to the ground plane, of incidence upon the array of a radio wave arriving from a remote source and of the ground reflection coefficient p;

first means associated with each triplet to combine vectorially the information signals obtained from the outermost antennae of that triplet to provide a first derived signal of which the amplitude represents the modulus of such combination;

second means associated with each triplet arranged to derive form an information signal obtained from the center antenna of each triplet a second derived signal of which the amplitude represents the modulus of that information signal from the said center antenna;

dividing means associated with each triplet and arranged to divide one derived signal by the other to provide a quotient signal for each triplet which is a function of θ but not of p; and selection means to provide at least one of said quotient signals which provides a measure of the angle of elevation.

9. An antenna array as in claim 8 in which the selection means is arranged to provide an optimum value of measurement of angle of elevation above the ground plane of received radio waves.

10. An antenna array as in claim 9 in which the optimum value is the measurement having the highest sensitivity and said selection means is arranged to favour the triplet having the most appropriate spacing.

11. An antenna array as in claim 9 in which the optimum value is the measurement having the highest value of strength S and the selection means is arranged to favour the triplet with the most appropriate height above the ground plane.

12. An antenna array as in claim 11 further comprising: circuit means to determine the rate of variation of each quotient with variation of θ, and wherein the selection means is arranged to favour the quotient having the greatest rate of variation.

13. An antenna as in claim 8 comprising nine antenna elements arranged as three linear triplets.

14. An antenna array as in claim 8 comprising seven antenna elements arranged as three triplets.

15. An antenna array apparatus for use in measuring the relative orientation of associated radio signals by radio interferometric technique, said apparatus comprising;

at least four antennae spaced so as to provide at least two equi-spaced linear triplets perpendicular to a ground plane, the center antenna of each triplet having different spacing;

radio transmitter means to produce from each antenna of each triplet a coded transmission of which both amplitude and phase relative to the amplitude and phase of information signals obtained from other antennae of each triplet at a point in space are functions of the elevation angle, θ, of that point with respect to the ground plane, and of the ground reflection coefficient p;

first means associated with each triplet to combine vectorially the information signals received by a receiver at a point in space, from the outermost antennae of that triplet to provide a first derived signal of which the amplitude represents the modulus of such combination;

second means in the said receiver associated with each triplet arranged to derive from an information signal obtained from the center antenna of each triplet a second derived signal of which the amplitude represents the modulus of that information signal from the said center antenna;

dividing means in the receiver associated with each triplet arranged to divide one derived signal by the other to provide a quotient signal for each triplet which is a function of θ but not of p; and selection means to provide at least one of said quotient signals which provides a measure of the angle of elevation.

16. An antenna array apparatus for use in measuring the relative orientation of associated radio signals by radio interferometric techniques, said apparatus comprising;

at least four antennae spaced so as to provide at least two equi-spaced linear triplets perpendicular to a ground plane, the center antenna of each triplet being at a different height above the ground plane;

radio transmitter means to produce from each antenna of each triplet a coded transmission of which both amplitude and phase relative to the amplitude and phase of information signals obtained from other antennae of each triplet at a point in space are functions of the elevation angle, θ, of that point with respect to the ground plane, and of the ground reflection coefficient p;

first means associated with each triplet to combine vectorially the information signals received by a receiver at a point in space, from the outermost antennae of that triplet to provide a first derived signal of which the amplitude represents the modulus of such combination;

second means in the said receiver associated with each triplet arranged to derive from an information signal obtained from the center antenna of each triplet a second derived signal of which the amplitude represents the modulus of that information signal from the said center antenna;

dividing means in the said receiver associated with each triplet arranged to divide one derived signal by the other to provide a quotient signal for each triplet which is a function of θ but not of p; and selection means to provide at least one of said quotient signals which provides a measure of the angle of elevation.

17. A radio interferometric antenna array apparatus comprising:

plural radio antennae, the elements of each of plural triplets of said antennae being set in line orthogonal to a reflecting ground plane, the spacing of each triplet, and the height of the center of each triplet, above the ground plane being set independently to optimize the measurement of the arrival angle of electromagnetic radiation, or, if used as a transmitter, of the coding by electromagnetic transmissions of angles in space.

18. A radio antenna array apparatus as in claim 17 in combination with signal processing receivers to measure the elevation angle of arrival of a radio signal with selected accuracy and integrity within at least one range of angles from near zero to near ninety degrees, with respect to the ground plane.

19. A radio antenna array apparatus as in claim 17 in combination with radio transmitters to code angles in space, with selected accuracy and integrity over at least one range of angles, within the sector from near zero to near ninety degrees, with respect to the ground plane.

20. A radio antenna array apparatus as in claim 17 in which the center height is set approximately equal to twice the spacing, so that the signal amplitude from the central element of a triplet is non-zero and near its maximum, and, when using square law receivers, the angle measurement capability of the triplet is at its most sensitive.

21. A radio antenna array apparatus as in claim 17 comprising three triplets l, m, n to measure the elevation angles of emitters at heights above the ground plane, which subtend a small angle at the array having inter-element spacings d and height of the center element h approximately equal to the following in terms of wavelength;

| | |
|---|---|
| d(l) = 1.5 | h(l) = 2.5 |
| d(m) = 3.75 | h(m) = 7.75 |
| d(n) = 7.5 | h(n) = 15.25. |

22. A system comprising an array apparatus as in claim 17 in combination with receivers and signal processing circuits and secondary surveillance radar equipment to provide an aircraft height monitor.

23. A transmitting array apparatus comprising a plurality of triplets as in claim 1, which generates coded signals in space, equivalent to those of the glidepath sub-system of an Instrument Landing System.

24. A radio interferometric system comprising:

at least one linear array of spaced apart antenna elements disposed perpendicular to a ground plane;

a plurality of interferometric signal processing circuits connected to process incoming radio signals associated with said elements so as to produce a plurality of respectively associated quotient signals that are each a different function of the elevation angle of incoming radio waves with respect to the array; and a selector connected to supply at least a selected one of said quotient signals for subsequent processing to provide data representative of the relative arrival angle of said incoming radio signals.

25. A radio interferometric method comprising:

disposing at least one linear array of spaced apart antenna elements perpendicular to a ground plane;

processing incoming radio signals associated with said elements so as to produce a plurality of respectively associated quotient signals that are each a different function of the elevation angle of incoming radio waves with respect to the array; and subsequently processing at least a selected one of said quotient signals to provide data representative of the relative arrival angle of said incoming radio signals.

26. A system comprising an array apparatus as in claim 17 used as an elevation measuring sub-system of an Instrument Landing System to provide guidance information for incoming aircraft.

27. An antenna array apparatus for use in measuring the relative orientation of received radio signals by radio interferometric techniques, said apparatus comprising:

at least one equi-spaced triplet of RF transmitting antennae disposed in a predetermined orientation with respect to a ground plane generating coded information signals in space in which the quotient between a signal derived from a center one of a triplet of antennae and one derived from the sum of its outer pair of antennae can be calculated to determine the glidepath of an aircraft instrument landing system; and remote radio receiver means connected to obtain from the triplet said coded information signals information representing the elevation angle, θ, with respect to the ground plane, of radio waves arriving from the triplet.

* * * * *